B. A. STOWE.
GEARING.
APPLICATION FILED MAR. 24, 1909.
988,043.
Patented Mar. 28, 1911.
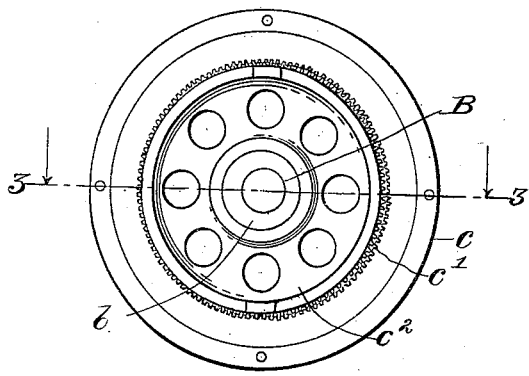
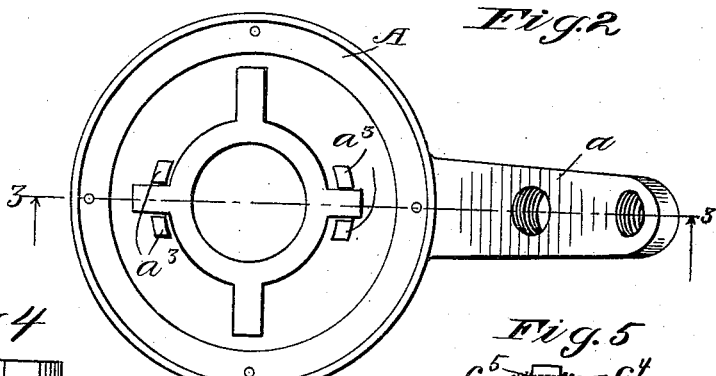
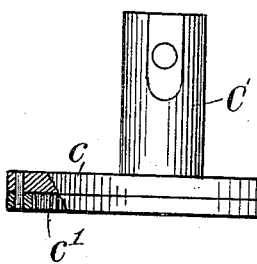
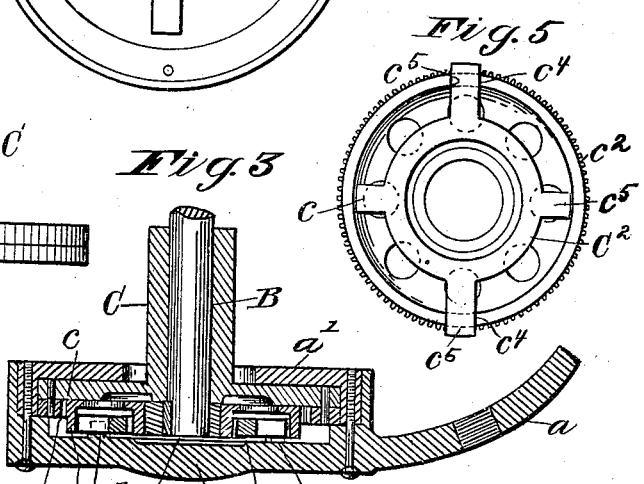
Witnesses:
J. C. Turner
Jno. F. Oberlin
Inventor:
Bernard A. Stowe
by J. B. Fay
Attorney.
THE NORRIS PETERS CO., WASHINGTON, D. C.

UNITED STATES PATENT OFFICE.

BERNARD A. STOWE, OF CLEVELAND, OHIO, ASSIGNOR, BY MESNE ASSIGNMENTS, TO THE ADAMS-BAGNALL ELECTRIC COMPANY, OF CLEVELAND, OHIO, A CORPORATION OF OHIO.

GEARING.

988,043.  Specification of Letters Patent.  Patented Mar. 28, 1911.

Application filed March 24, 1909. Serial No. 485,466.

*To all whom it may concern:*

Be it known that I, BERNARD A. STOWE, a citizen of the United States, resident of Cleveland, county of Cuyahoga, and State of Ohio, have invented a new and useful Improvement in Gearing, of which the following is a specification, the principle of the invention being herein explained and the best mode in which I have contemplated applying that principle, so as to distinguish it from other inventions.

The object of the invention is the provision of a simple and compact arrangement of reduction gearing whereby a considerable reduction in the rate of speed of the driven member from that of the driving member may be secured.

To this end, said invention consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—Figure 1 is a plan view showing the interior arrangement of one part of my improved gearing; Fig. 2 similarly shows in plan view another part of such gearing, complementary to such first part; Fig. 3 is a sectional view of the gearing in assembled condition; Fig. 4 is partly a side elevation and partly a section of one of the elements of said gearing; and Fig. 5 is a plan view of one of the elements as illustrated in Fig. 1, but showing together therewith, and in operative relation thereto, one of the elements shown in Fig. 2.

The particular embodiment of my improved gearing illustrated, in no sense implies a limitation in the number of various uses to which such gearing may be applied. In the form shown, the outer casing A, Figs. 2 and 3, which inclose the operative parts of the mechanism, constitutes the driven member of the device, and while shown as having an arm $a$ for communicating its motion to other exterior parts, may, of course, be adapted to otherwise communicate its motion or to operate directly as occasion may demand. The driving member consists of a shaft B that is rotatably mounted in a relatively fixed member C upon which said driven member A is also rotatably mounted, and which is practically inclosed by the inner face $a'$ of the driven member. The driven member A thus, in effect, constitutes a casing as it has already been termed. Fixed member C is in the form of a flanged sleeve and while it thus forms the bearing for the driving member or shaft B, it also bears on the outer face of its flanged portion $c$ an internal annular gear $c'$. This casing, constituting driven member A, has a bearing both on the circumference and on the respective faces of the annular gear $c'$ and supporting flange $c$. The end $b$ of shaft B which projects within the casing, and so within said annular gear, has eccentrically mounted upon it a gear $c^2$ that has epicyclic engagement with the annular gear $c'$. As a result of this construction, rotation of the shaft will effect a rotation of such epicyclic gear in the opposite direction and at a reduced rate of speed, depending upon the ratio existing between the number of teeth thereon, and the number of teeth on said annular gear, as will be readily understood. By making the epicyclic gear very nearly the size of the annular gear as in the case illustrated, a very considerable reduction can be thus effected; thus if the annular gear has 128 teeth and the other 127 teeth, the latter will only make one complete rotation during 128 revolutions of the shaft.

Connection between the epicyclic gear $c^2$ and the driven member A is secured by providing sets of lugs $a^3$ on the inner face of the member, and notches $c^4$ on the outer face of the gear, wherewith the rectangularly related arms $c^5$ of a preferably cruciform member $C^2$ are adapted to slidably engage. As result of this form of connection, it will be seen that said driven member is non-rotatably secured to the epicyclic gear, but that the latter is permitted free movement with respect to the former in rectangularly related directions. An even continuous movement of the driven member is thus secured, irrespective of the displacement of the epicyclic gear about the center of the driving shaft, owing to its eccentric relation thereto.

Not only do the fewness of parts and operative simplicity of the device commend it for the purpose for which it is designed, but, owing to the character of these parts the cost of manufacture can be kept low, thus rendering the gearing available in various commercial fields where this is an important consideration.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of a relatively stationary internal annular gear, a driving shaft having its end journaled in said gear, a second gear eccentrically and rotatably mounted upon the end of said shaft and having engagement with said annular gear, a driven member rotatably mounted on said stationary gear, and means non-rotatably connecting said driven member with said second gear but permitting movement of the latter with respect to the former in rectangularly related directions, the driven member bearing on the circumference and the two faces of the annular gear and inclosing both of said gears and said means.

2. The combination of a relatively stationary internal annular gear, a driving shaft having its end journaled in said gear, a second gear eccentrically and rotatably mounted upon the end of said shaft and having engagement with said annular gear, a driven member rotatably mounted on said annular gear, and a cruciform member having rectangularly related pairs of arms, one such pair of arms slidably engaging said driven member and the other pair similarly engaging said second gear, the driven member bearing on the circumference and on the respective faces of the annular gear, and inclosing both of said gears and said member.

Signed by me, this 20th day of March, 1909.

BERNARD A. STOWE.

Witnesses:
ANNA L. GILL,
JNO. F. OBERLIN.

---

Copies of this patent may be obtained for five cents each, by addressing the "Commissioner of Patents, Washington, D. C."